United States Patent
Cooreman et al.

(10) Patent No.: US 7,201,325 B1
(45) Date of Patent: Apr. 10, 2007

(54) MICROPROCESSOR CARD INCLUDING A HARD-WIRED COMMUNICATION CIRCUIT

(75) Inventors: Pascal Cooreman, Marseilles (FR); Stephane Rayon, La Ciotot (FR); Bertrand Gomez, Roquevaire (FR)

(73) Assignee: Gemplus, Gemenos Cedex (FR)

( * ) Notice: Subject to any disclaimer, the term of this patent is extended or adjusted under 35 U.S.C. 154(b) by 0 days.

(21) Appl. No.: 09/601,111

(22) PCT Filed: Jan. 14, 1999

(86) PCT No.: PCT/FR99/00054

§ 371 (c)(1),
(2), (4) Date: Jul. 27, 2000

(87) PCT Pub. No.: WO99/38116

PCT Pub. Date: Jul. 29, 1999

(30) Foreign Application Priority Data

Jan. 27, 1998 (FR) .................. 98 00858

(51) Int. Cl.
*G06K 19/06* (2006.01)
(52) U.S. Cl. ........................... 235/492; 235/487
(58) Field of Classification Search ............. 235/487, 235/482, 486, 492, 436, 437, 441, 375, 380, 235/382, 382.5; 711/101, 102, 103, 104
See application file for complete search history.

(56) References Cited

U.S. PATENT DOCUMENTS

| | | | | | |
|---|---|---|---|---|---|
| 4,816,654 | A | * | 3/1989 | Anderl et al. | 235/380 |
| 5,038,025 | A | * | 8/1991 | Kodera | 235/492 |
| 5,161,231 | A | * | 11/1992 | Iijima | 710/15 |
| 5,182,442 | A | * | 1/1993 | Takahira | 235/492 |
| 5,237,609 | A | * | 8/1993 | Kimura | 713/193 |
| 5,365,047 | A | * | 11/1994 | Yamaguchi | 235/380 |
| 5,420,412 | A | | 5/1995 | Kowalski | 235/492 |
| 5,729,004 | A | | 3/1998 | Kim et al. | 235/492 |
| 5,801,364 | A | * | 9/1998 | Kara et al. | 235/375 |
| 6,092,147 | A | * | 7/2000 | Levy et al. | 711/6 |
| 6,264,108 | B1 | * | 7/2001 | Baentsch | 235/380 |

FOREIGN PATENT DOCUMENTS

EP 0513507 A1 11/1992

* cited by examiner

*Primary Examiner*—Ahshik Kim
(74) *Attorney, Agent, or Firm*—Buchanan, Ingersoll & Rooney, PC

(57) ABSTRACT

The invention relates to cards with a microprocessor and contacts. The invention lies in the fact that a communication device of the asynchronous type is disposed between the contacts and the microprocessor so as to relieve the microprocessor of the communication tasks and thus allow better use of the central unit of the microprocessor and the associated memories. This device includes an analysis circuit, a circuit for checking the integrity of the series of pulses, a circuit for determining the characters in the series of pulses and pluralities of registers which are connected with the microprocessor.

9 Claims, 1 Drawing Sheet

MICROPROCESSOR CARD INCLUDING A HARD-WIRED COMMUNICATION CIRCUIT

This disclosure is based upon, and claims priority from French Patent Application No. 98/00858, filed Jan. 27, 1998, and International Application No. PCT/FR99/00054, filed Jan. 14, 1999, the contents of which are incorporated herein by reference.

BACKGROUND OF THE INVENTION

The invention relates to microprocessor cards which are capable of performing operations on data supplied by memories associated with the microprocessor or by a terminal to which they are connected.

In a simplified manner, a microprocessor 10 (see single FIGURE) comprises a central unit 12 which communicates with a program memory 16, a data memory 18 and a memory 14 of the RAM type, RAM being the English acronym for "Random Access Memory". This microprocessor 10 is connected to a terminal 20 by means of a link 32 and a contact pin 22.

The electrical signals applied by the terminal 20 to the contact pin 22 are analysed by the microprocessor 10 by means of a special so-called communication program recorded in the program memory 16, this communication program being adapted to the communication protocol which controls the exchanges of information between the card and the terminal in both directions.

Analysis of the electrical signals applied to the contact pin 22 constitutes a relatively lengthy task for the central unit 12, a task which mobilises a large part of the memories.

In a similar manner, the output of the information from the microprocessor 10 to the terminal 20 by means of the contact pin 22 also takes up the time of the central unit and space in the memories.

The aim of the present invention is therefore to produce a microprocessor card which does not have the aforementioned drawbacks so as to release time for the microprocessor for other tasks and to release memory capacity for these other tasks.

SUMMARY OF THE INVENTION

The invention lies in the fact that the communications between the terminal and the microprocessor card take place by means of a communication device, the said device being in the form of a hard-wired circuit.

The invention has the advantage of facilitating the development of a card and in particular reducing the qualification period and costs for it, the communication device, in the form of an independent part, being able to be qualified once and for all.

The invention relates to a microprocessor card with contacts, characterised in that the microprocessor communicates with the terminal by means of an asynchronous communication device, the said communication device comprising:

a circuit for analysing the electrical signals transmitted by the terminal so as to supply a series of electrical pulses, a circuit for checking the series of electrical pulses in order to determine the integrity of the series of electrical pulses and to supply a code indicating the status of the check, a circuit for determining each character from the pulses in the series, a first plurality of registers for recording the characters of the command and the address supplied by the character determination circuit and making them available to the microprocessor, a second plurality of registers for recording the characters of the data supplied by the character determination circuit and making them available to the microprocessor, a circuit for acknowledging the command, associated with the first plurality of registers, for analysing the characters of the command and supplying a code indicating the command reception status, a third plurality of registers for recording the codes for the data and for the status of execution of the command supplied by the microprocessor, and a circuit for transmitting to the terminal the codes supplied by the checking circuit, the command acknowledgement circuit and the third plurality of registers.

BRIEF DESCRIPTION OF THE DRAWING

The invention will be understood more clearly by means of the following description of a particular example embodiment, the said description being given in relation to the accompanying drawing in which the single FIGURE is a functional diagram of a microprocessor card having characteristics of the invention.

DETAILED DESCRIPTION

Figure 1:
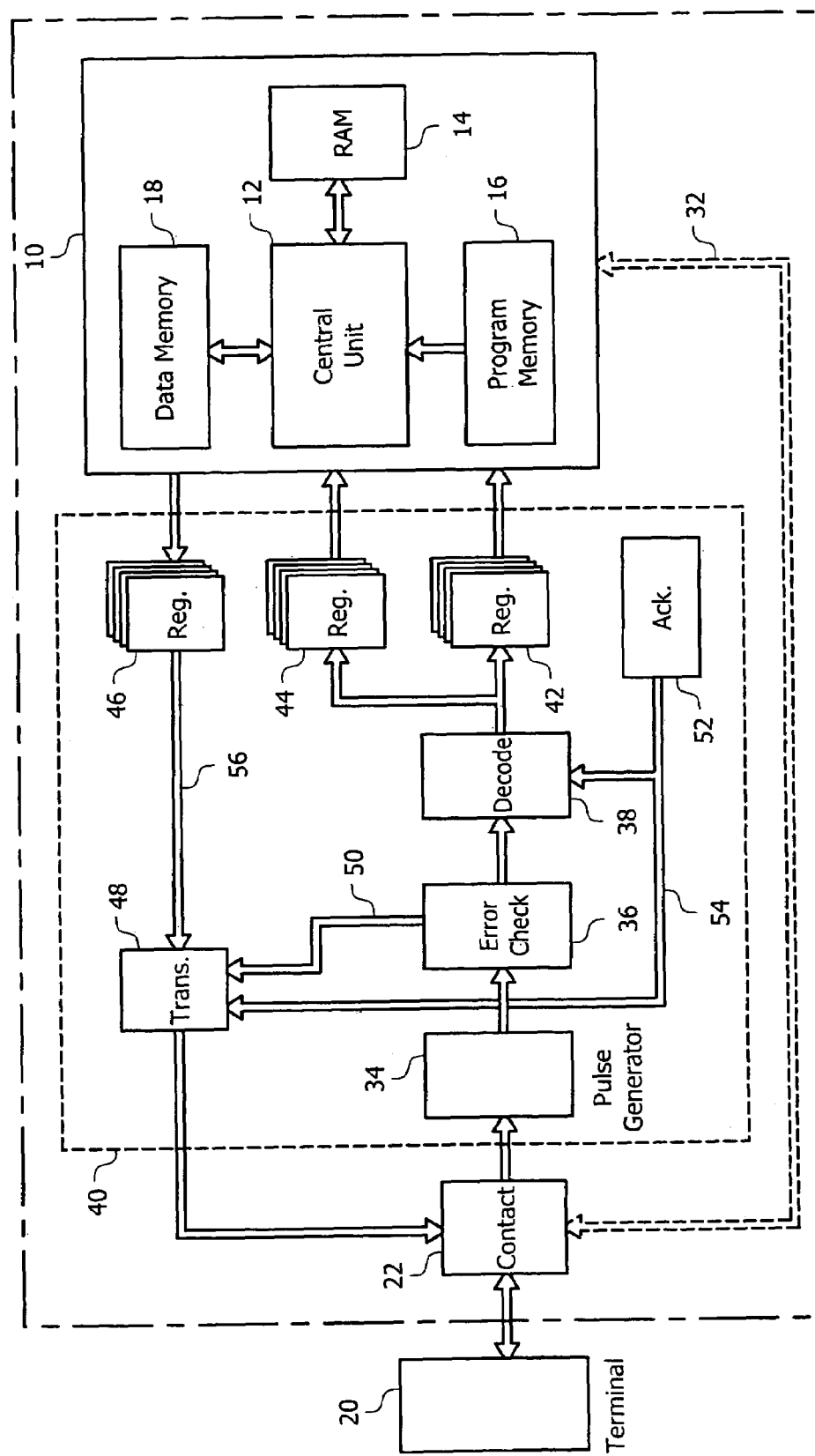

As indicated in the introduction, a microprocessor card 30 of the prior art comprises essentially a microprocessor 10 connected to a terminal 20 by means of a bidirectional link 32, depicted in dotted lines, and a contact connector 22. The binary electrical signals applied by the terminal 20 to the contacts 22 are analysed directly by the microprocessor 10. In addition, the binary electrical signals supplied by the microprocessor 10 are transmitted to the terminal 20 by means of the connection 32 and contacts 22.

In such an architecture, the microprocessor 10 acts directly in the bidirectional communication process, which presents certain drawbacks, notably those disclosed in the introduction.

According to the invention, the bidirectional communication process is implemented by a communication device 40, disposed between the contact terminals 22 and the microprocessor 10.

The communication device 40 comprises:

a circuit 34 for analysing the electrical signals applied by the terminal 20 to the contact terminal 22 of the card 30; this circuit 34 analyses the electrical signals appearing on the contacts 22 so as to present them in the form of a series of electrical pulses of the binary type;

a circuit 36 for checking the series of binary electrical pulses in order to determine the integrity of the series of electrical pulses, that is to say to check whether the series is complete in accordance with predetermined rules, for example by the use of a binary parity digit or a redundant code in the series; this checking circuit 36 supplies a binary signal or a binary code indicating the result of this check on a link 50;

a circuit 38 for determining each character of the command or instruction, address or data item from the pulses in the series checked;

a first plurality of registers 42 for recording on the one hand the characters of the command or instruction and on the other hand the characters of the address, as they are determined by the determination circuit 38;

a second plurality of registers 44 for recording the characters of the data supplied by the determination circuit 38;

a circuit 52 for acknowledging the command associated with the first plurality of registers 42 in order to analyse the characters of the command or instruction and to supply a signal or binary code indicating the terminal or the faulty reception of the command on a link 54, a third plurality of registers 46 for recording on the one hand the data supplied by the microprocessor 10 and on the other hand the status code indicating the statuses of execution of the command by the microprocessor 10, and a circuit 48 for transmitting, to the terminal 10 by means of the contacts 22, the signals and/or codes supplied by the checking circuit 36 on the link 50, by the acknowledgement circuit 52 on a link 54 and by the third plurality of registers 46 on a link 56.

The different circuits making up the communication device 40 are adapted to the communication protocol chosen. This communication protocol is of the asynchronous type and can be the one known by the name of RS232, with regard to a serial link habitually used between a so-called personal computer and its peripherals, or by the names V22, V23, etc with regard to connection by modem.

In order to check the integrity of the series of pulses, the terminal 20 must be designed to add redundant information to the signals transmitted, information whose presence the checking circuit 36 is capable of checking. It may be a case of the presence of a parity bit or binary digit or a redundant cyclic code. It should be noted that many communication protocols make provision for such a redundancy in order to check the integrity of the information transmitted. Where this check is not successful, the command is not executed and this decision is indicated by a code on the link 50.

This integrity check relates only to the succession of binary digits corresponding to the pulses in the series; the check on the command is carried out by the acknowledgement circuit 52 which determines that the command is complete and correct and indicates this on the link 54 by a particular code. In the event of an error, the circuit 52 can indicate this by another particular code. These particular codes are transmitted to the transmission circuit 48 but also to the character determination circuit 38 in order to indicate to it, in the event of correct acknowledgement, that the following characters are to be switched to the second plurality of registers 44 provided for recording the data transmitted by the terminal after the command if the latter has indeed been received in its entirety.

The invention claimed is:

1. A card with a microprocessor and at least one contact, and a communication device in the form of a hard-wired circuit disposed between the contact and the microprocessor that checks the integrity of signals transmitted between the microprocessor and a terminal, wherein said communication device includes:

means to determine whether an item of information received by the card from the terminal is erroneous; and means to generate and return at least one item of information to the terminal which is a function of said determination.

2. A card with a microprocessor and at least one contact according to claim 1, wherein the communication device comprises:

a circuit for analysing electrical signals transmitted by the terminal so as to supply a series of electrical pulses, a circuit for checking the series of electrical pulses in order to determine the integrity of the series of electrical pulses and to supply a code indicating the status of the check, a circuit for determining each character from the pulses in the series, a first plurality of registers for recording characters of a command and an address supplied by the character determination circuit and making them available to the microprocessor, a second plurality of registers for recording characters of data supplied by the character determination circuit and making them available to the microprocessor, a circuit for acknowledging the command, associated with the first plurality of registers, for analysing the characters of the command and supplying a code indicating a command reception status, a third plurality of registers for recording codes for the data and for the status of execution of the command supplied by the microprocessor, and a circuit for transmitting to the terminal the codes supplied by the checking circuit, the command acknowledgement circuit and the third plurality of registers.

3. A card with microprocessor and at least one contact according to claim 2, wherein the analysis circuit detects the signals transmitted and presents them in the form of a series of binary electrical pulses.

4. A card with a microprocessor and at least one contact according to claim 2 wherein the checking circuit checks for a binary parity digit or a cyclic redundancy code and supplies a corresponding signal or code.

5. A card with a microprocessor and at least one contact card according to claim 3, wherein the checking circuit checks for a binary parity digit or a cyclic redundancy code and supplies a corresponding signal or code.

6. The card of claim 1, wherein the item of information generated by said generating means comprises an indication whether a signal received from the terminal contains an error.

7. The card of claim 6, wherein said generating means generates said indication on the basis of redundant information contained in the received signal.

8. The card of claim 1, wherein the item of information generated by said generating means comprises an indication whether a command contained in a signal received from the terminal is complete and correct.

9. The card of claim 1, wherein said communication device operates according to an asynchronous communication protocol.

\* \* \* \* \*